United States Patent
Mabara et al.

(10) Patent No.: US 10,931,843 B2
(45) Date of Patent: Feb. 23, 2021

(54) MULTI FEED DETECTION DEVICE, PAPER TRANSPORT DEVICE, AND NON-TRANSITORY COMPUTER READABLE MEDIUM STORING PROGRAM

(71) Applicant: FUJI XEROX CO., LTD., Tokyo (JP)

(72) Inventors: Tsuyoshi Mabara, Kanagawa (JP); Akira Yamazaki, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/379,760

(22) Filed: Apr. 9, 2019

(65) Prior Publication Data

US 2020/0106906 A1 Apr. 2, 2020

(30) Foreign Application Priority Data

Oct. 2, 2018 (JP) .............................. JP2018-187103

(51) Int. Cl.
*H04N 1/00* (2006.01)

(52) U.S. Cl.
CPC ..... *H04N 1/00745* (2013.01); *H04N 1/00702* (2013.01); *H04N 1/00774* (2013.01); *H04N 1/00798* (2013.01); *H04N 2201/0081* (2013.01)

(58) Field of Classification Search
None
See application file for complete search history.

(56) References Cited

U.S. PATENT DOCUMENTS

2012/0314267 A1* 12/2012 Suzuki et al.
2018/0086579 A1*  3/2018 Andoh .................. B65H 5/062

FOREIGN PATENT DOCUMENTS

| JP | 2013-082539 | 5/2013 |
| JP | 2014-084184 | 5/2014 |
| JP | 2017-149504 | 8/2017 |

* cited by examiner

*Primary Examiner* — Lennin R Rodriguezgonzalez
(74) *Attorney, Agent, or Firm* — JCIPRNET

(57) ABSTRACT

A multi feed detection device includes a position detector that detects a position of paper being transported, a multi feed detector that is disposed on a downstream side of the position detector in a paper transport direction and detects multi feed of the paper being transported, and a control section that performs control such that multi feed detection by the multi feed detector is stopped when a leading end of paper being transported next to paper, on which multi feed detection is executed by the multi feed detector, is detected by the position detector.

3 Claims, 6 Drawing Sheets

MULTI FEED DETECTION DEVICE, PAPER TRANSPORT DEVICE, AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2018-187103 filed Oct. 2, 2018.

BACKGROUND

(i) Technical Field

The present invention relates to a multi feed detection device, a paper transport device, and a non-transitory computer readable medium storing a program.

(ii) Related Art

JP2017-149504A discloses a medium transport device including multi feed detection means, end portion detection means, control means that determines multi feed or non-multi feed based on a multi feed detection signal from the multi feed detection means and an end portion position detection signal from the end portion detection means. The control means includes multi feed region determination means that determines presence or absence of a multi feed region in a detection target of the end portion detection means based on the multi feed detection signal from the multi feed detection means, region position detection means that detects positional relationship information between the multi feed region and a non-multi feed region in the detection target based on the multi feed detection signal and the end portion position detection signal, and multi feed determination means that determines multi feed or non-multi feed based on the positional relationship information between the multi feed region and the non-multi feed region.

JP2013-082539A discloses a paper feeding device including a placing unit where paper is placed, a paper feeding body that sends the paper placed in the placing unit, a transmitting unit that generates ultrasonic waves, an ultrasonic wave detecting unit that includes a receiving unit, which receives the ultrasonic waves generated by the transmitting unit and of which output changes according to a received amount of the ultrasonic waves, a signal processing unit that processes the output of the receiving unit and outputs a signal indicating a reception level, a detection processing unit that detects occurrence of multi feed based on a first multi feed detection threshold value determined in advance until leading end portion detection time elapses and detects occurrence of multi feed based on a second multi feed detection threshold value determined in advance in a case where the leading end portion detection time elapses, and a storage unit that stores the second multi feed detection threshold value and the first multi feed detection threshold value which is determined to be closer to a value of a signal when the receiving unit does not receive the ultrasonic waves than the second multi feed detection threshold value is.

JP2014-084184A discloses a sheet transport device that acquires leading end displacement time T1 between a first time point at which a leading end of the preceding document D is detected at a multi feed detection position P1 and a second time point at which a leading end of the following document D which is at a multi feed occurrence position is detected in a case where occurrence of multi feed is detected, determines whether or not the leading end displacement time T1 is equal to or higher than threshold value time Tth which is set to time in a case where a leading end position of the following document D at a time point at which a paper feeding unit stops driving becomes a position on an upstream side of a pair of resist rollers in a transport direction, and causes the pair of resist rollers to continue driving without stopping in a case where the leading end displacement time T1 has become equal to or higher than the threshold value time Tth.

SUMMARY

The shorter an interval between sheets of paper, the more paper can be transported in a paper transport device that continuously transports paper. However, in a case where the interval between sheets of paper is excessively short, an adjustment processing period for a multi feed detector which performs multi feed detection between sheets of paper cannot be secured.

Herein, multi feed detector adjustment processing is processing to respond to a change in output of the multi feed detector due to effects of a temperature and the like.

Aspects of non-limiting embodiments of the present disclosure relate to a multi feed detection device, a paper transport device, and a non-transitory computer readable medium storing a program in which an adjustment processing period for a multi feed detector can be secured.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a multi feed detection device including a position detector that detects a position of paper being transported, a multi feed detector that is disposed on a downstream side of the position detector in a paper transport direction and detects multi feed of the paper being transported, and a control section that performs control such that multi feed detection by the multi feed detector is stopped when a leading end of paper being transported next to paper, on which multi feed detection is executed by the multi feed detector, is detected by the position detector.

BRIEF DESCRIPTION OF THE DRAWINGS

Exemplary embodiment(s) of the present invention will be described in detail based on the following figures, wherein.

DETAILED DESCRIPTION

Next, an exemplary embodiment of the present invention will be described with a document reading apparatus given as an example.

Figure 1:
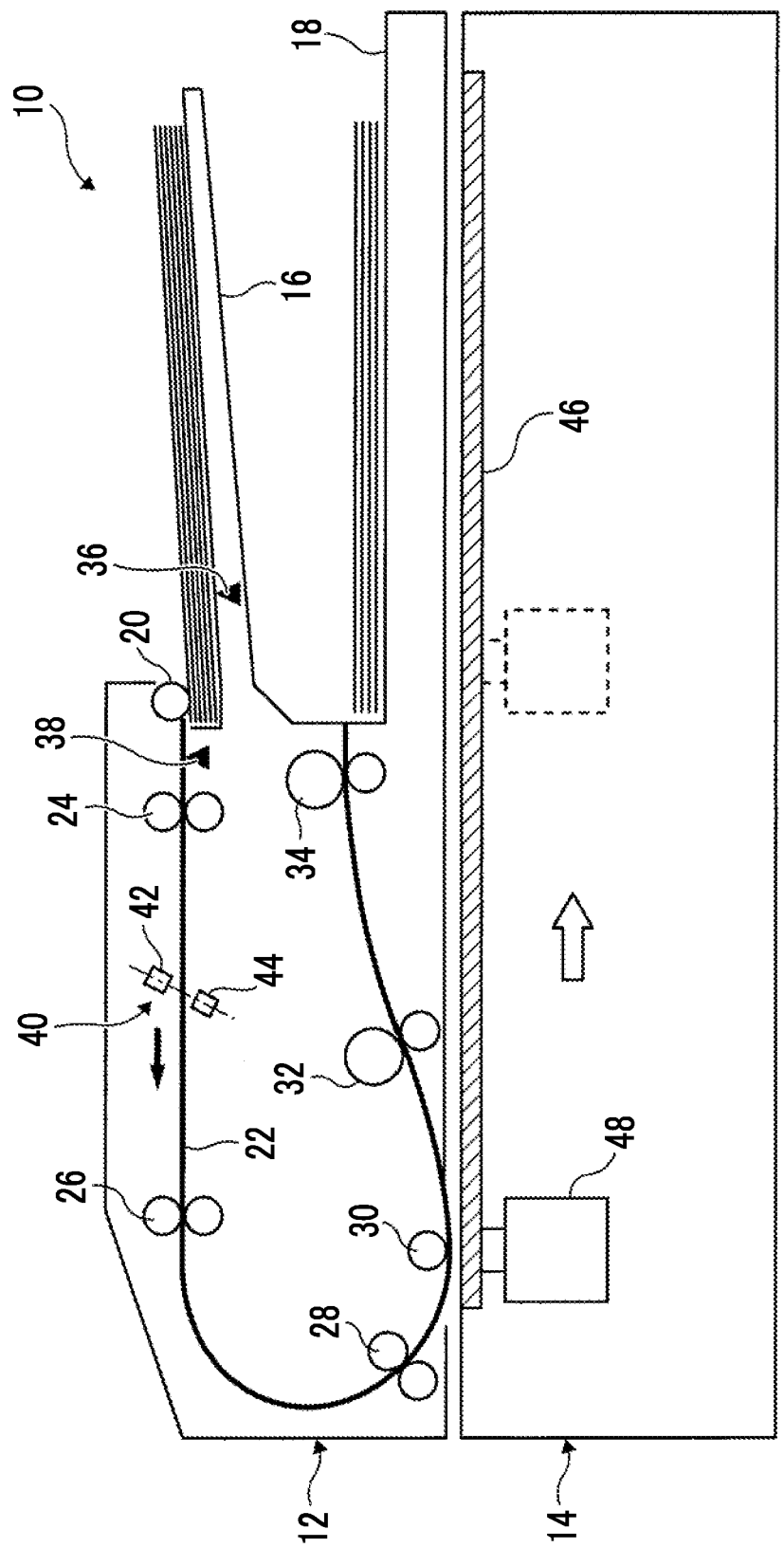
FIG. 1 is a schematic view illustrating a document reading apparatus in which a paper transport device according to an exemplary embodiment of the present invention is used.

FIG. 1 illustrates a document reading apparatus 10 having a document transport device 12 that is a paper transport device according to the exemplary embodiment of the present invention.

The document reading apparatus 10 includes the document transport device 12 and a reading unit 14 that reads a document transported by the document transport device 12.

The document transport device 12 has a document accommodating unit 16 that allows a document bundle consisting of a plurality of documents to be placed therein and a discharge paper accommodating unit 18 that is provided below the document accommodating unit 16 and allows the read document to be discharged thereto. In addition, the document transport device 12 includes a sending roller 20 that sends the document in the document accommodating unit 16. From an upstream side in a document transport direction, transport rollers 24 to 28, a platen roller 30, a transport roller 32, and a discharge roller 34 are provided in this order on a transport path 22 through which a document is transported. The transport roller 24 is a separator roller, and separates documents one by one. The platen roller 30 presses down a document, which is being read by the reading unit 14, from above. The discharge roller 34 further transports the read document to be discharged to the discharge paper accommodating unit 18.

The transport roller 24 is provided with an encoder. Thus, an angle at which the transport roller 24 rotates can be detected, and a distance of a document which is being transported can be measured from the detected angle and a roller diameter.

The document accommodating unit 16 is provided with a document detector 36. The document detector 36 is configured with, for example, a light emitting element and a light receiving element, and detects whether or not there is a document between the light emitting element and the light receiving element. In a case where there is a document in the document accommodating unit 16, the document detector 36 detects the presence of the document since light from the light emitting element is blocked by the document. In a case where there is no document in the document accommodating unit 16, the document detector 36 detects the absence of the document since light from the light emitting element is received by the light receiving element.

A position detector 38 is provided on a downstream side of the sending roller 20 in the document transport direction. The position detector 38 is configured with a light emitting element and a light receiving element just as the document detector 36. In a case where a document is not being transported on the position detector 38, light from the light emitting element is received by the light receiving element, and it is detected that a document is not being transported. In a case where a document is being transported on the position detector 38, light from the light emitting element is blocked by the document, and it is detected that a document is being transported. When a leading end of a document has reached the position detector 38, the position detector 38 changes from off (light from the light emitting element is being received by the light receiving element) to on (light from the light emitting element is being blocked), and detects the position of the leading end of the document. In addition, when a trailing end of the document has reached the position detector 38, the position detector 38 changes from on to off, and detects the position of the trailing end of the document.

A multi feed detector 40 is provided between the transport roller 24 and the transport roller 26, which are on the downstream side of the position detector 38 in the document transport direction. The multi feed detector 40 is configured by, for example, an ultrasonic sensor, and is configured with a transmitting unit 42 and a receiving unit 44. Ultrasonic waves generated from the transmitting unit 42 are received by the receiving unit 44. In a case where documents are not doubly fed, ultrasonic waves are unlikely to be attenuated. In a case where documents are doubly fed, ultrasonic waves are more attenuated compared to a case where documents are not doubly fed since air gets in between the document and the document, and detection as to whether or not there is multi feed is made based on the level of output of the ultrasonic waves received by the receiving unit 44.

Although the transmitting unit 42 and the receiving unit 44 are disposed on an upper side and a lower side respectively in the exemplary embodiment, the receiving unit 44 and the transmitting unit 42 may be conversely disposed on the upper side and the lower side respectively.

A platen glass 46 is provided on an upper surface of the reading unit 14. An image reading unit 48 is disposed below the platen glass 46. The image reading unit 48 remains stationary below the platen glass 46 and reads a document sent by the document transport device 12 (an automatic document feeding mode), or moves along the platen glass 46 and reads a document placed on the platen glass 46 (a platen mode).

Figure 2:
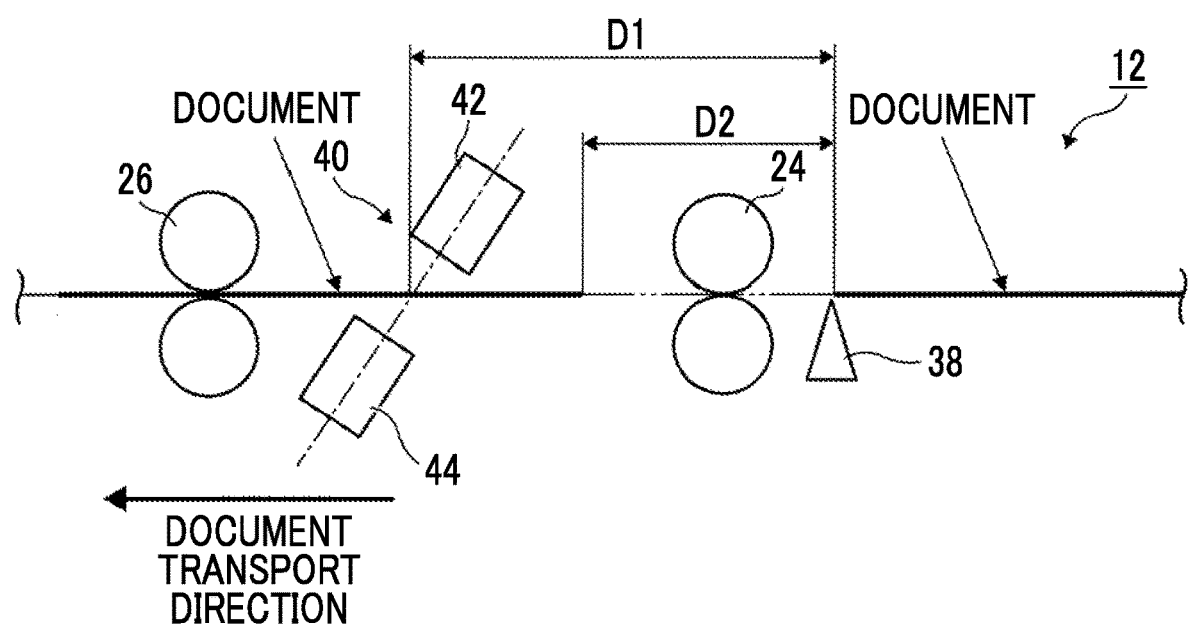
FIG. 2 is a schematic view illustrating portions of the paper transport device according to the exemplary embodiment of the present invention.

FIG. 2 illustrates the position detector 38, the multi feed detector 40, and a distance relationship between documents.

A detection position of the position detector 38 and a detection position of the multi feed detector 40 are spaced apart from each other at a distance D1. A trailing end of the previous document and a leading end of the next document are controlled to be at a distance D2 determined in advance. The distance D1 is longer than the distance D2. Therefore, when the leading end of the next document is detected by the position detector 38, the trailing end of the previous document is on the upstream side of the detection position of the multi feed detector 40. In addition, when the trailing end of the previous document is on the upstream side of the detection position of the multi feed detector in the document transport direction, a leading end of a document to be transported next is detected by the position detector 38.

Figure 3:
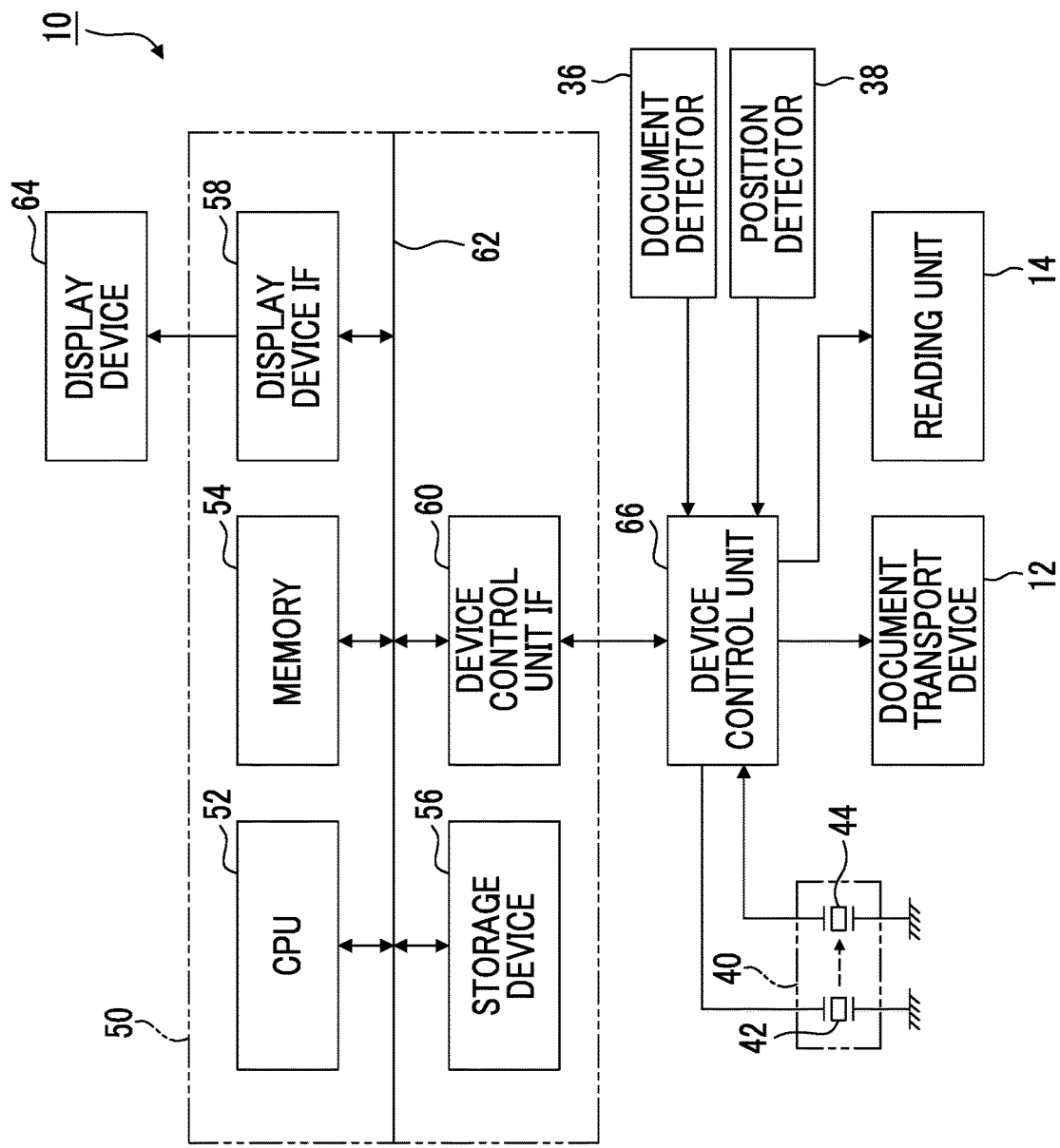
FIG. 3 is a block diagram showing a hardware configuration of the document reading apparatus in which the paper transport device according to the exemplary embodiment of the present invention is used.

FIG. 3 shows a hardware configuration of the document reading apparatus 10.

The document reading apparatus 10 has a main control unit 50. The main control unit 50 has a CPU 52, a memory 54, a storage device 56, a display device interface 58, and a device control unit interface 60, and these configuration elements are connected to each other via a control bus 62.

The CPU 52 executes processing determined in advance based on a control program stored in the memory 54. The memory 54 is a volatile memory such as a RAM. The memory 54 temporarily stores data. The storage device 56 is configured by a nonvolatile memory, for example, a flash memory, a hard disk, and the like, and stores necessary software or data. A display device 64 is connected to the display device interface 58. The display device 64 is configured by, for example, a liquid crystal display. The device control unit interface 60 is connected to a device control unit 66. The device control unit 66 is connected to the aforementioned document detector 36, the position detector 38, and the multi feed detector 40, and receives a detection signal from these detectors. In addition, the device control unit 66 is connected to the document transport device 12 and the reading unit 14, and controls these devices.

Figure 4:
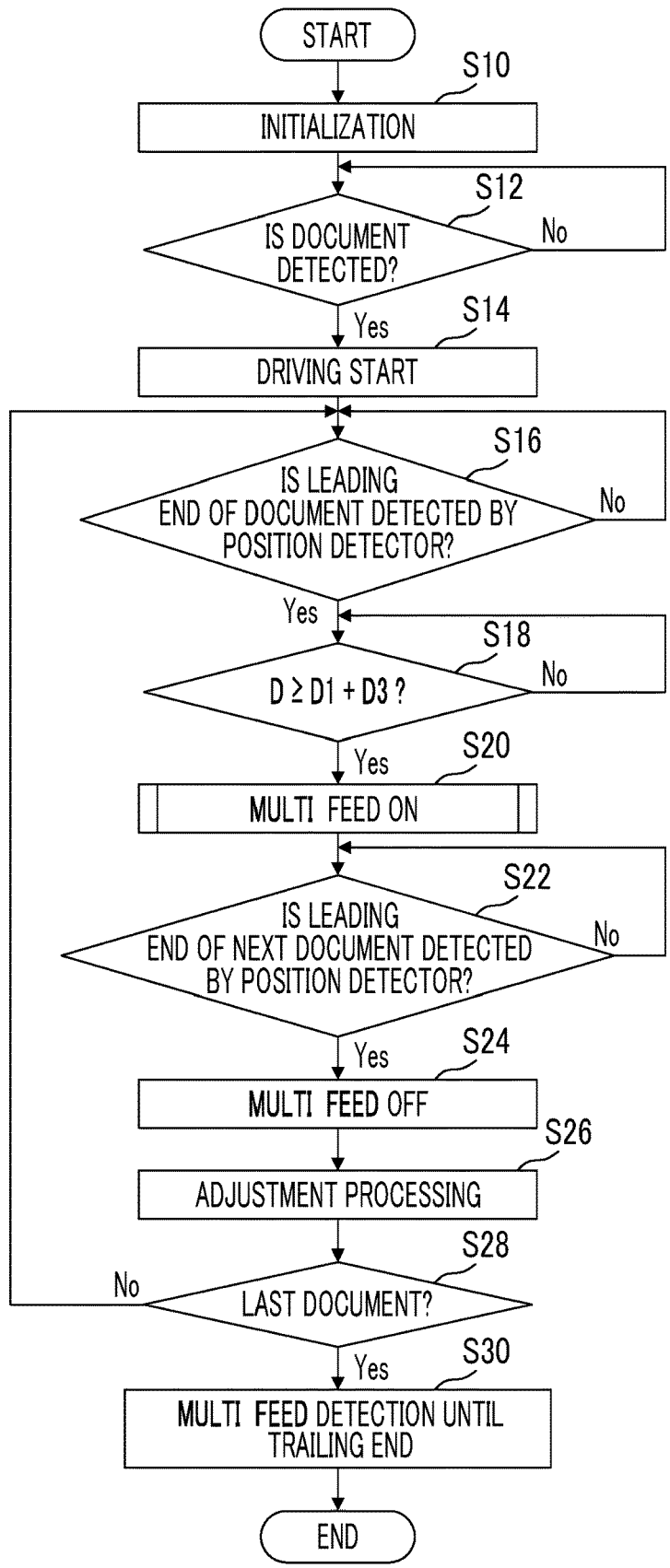
FIG. 4 is a flow chart showing operation flow of the paper transport device according to the exemplary embodiment of the present invention.

FIG. 4 shows operation flow of the document transport device 12.

First, each device is initialized in Step S10. In the next Step S12, detection as to whether or not there is a document is made based on the output of the document detector 36. In a case where it is determined that there is no document in Step S12, the document transport device stands by until a document is detected. In a case where it is determined that there is a document in Step S12, processing proceeds to the next Step S14.

Each device starts driving in Step S14. The sending roller 20 is intermittently driven such that a distance between documents is D2 according to a length in the document transport direction. In addition, each of the transport rollers 24 to 28 and 32, the platen roller 30, and the discharge roller 34 is continuously driven.

In the next Step S16, whether or not a leading end of a document is detected based on the output of the position detector 38 is determined. The document transport device stands by until the leading end of the document is detected in Step S16. In a case where it is determined that the leading end of the document is detected in Step S16, processing proceeds to the next Step S18.

Figure 5:
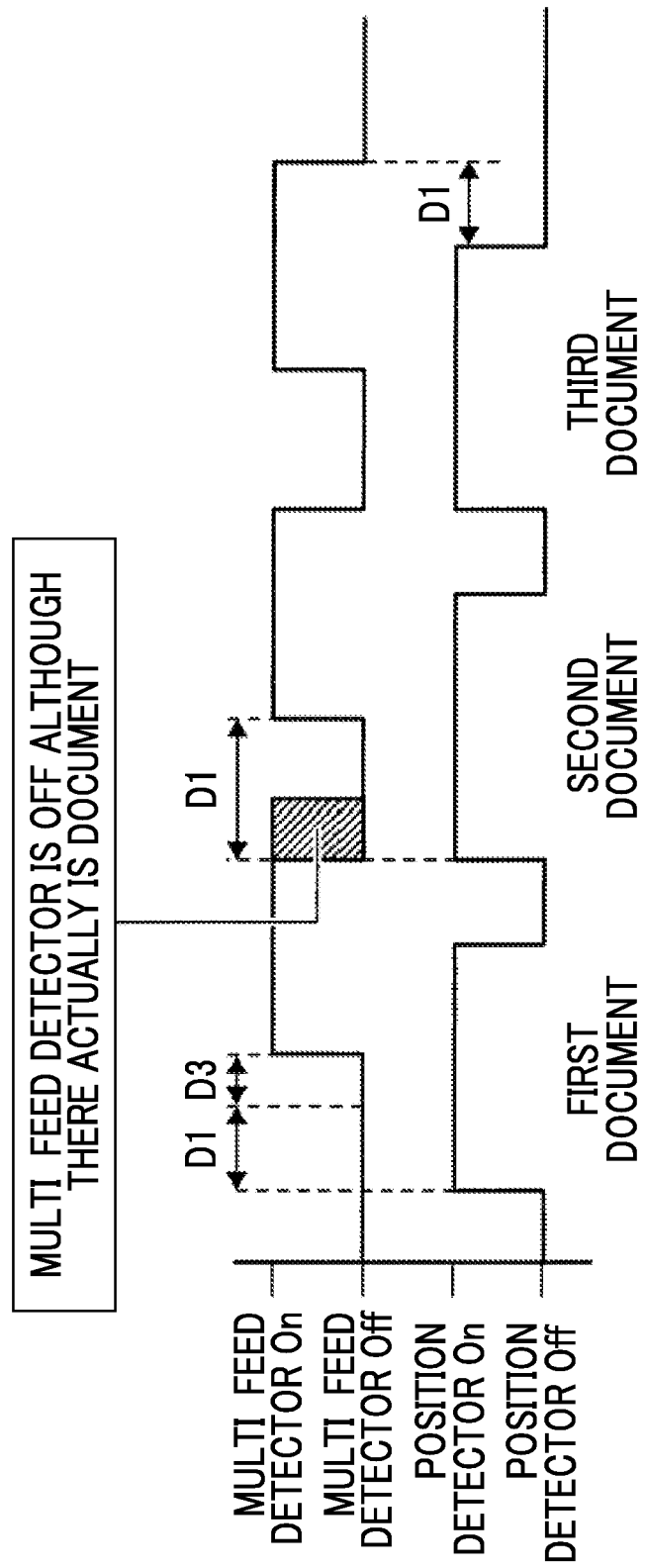
FIG. 5 is a timing chart showing temporal operation flow of a position detector and a multi feed detector according to the exemplary embodiment of the present invention.

In the next Step S18, whether or not a distance D of a document detected by the encoder provided in the aforementioned transport roller 24 has exceeded D1+D3 is determined as shown in FIG. 5. The distance D1 is a distance from the detection position of the position detector 38 to the detection position of the multi feed detector 40 as described above. The distance D3 is a distance determined in advance, and is, for example, 20 mm. That is, whether or not the leading end of the document has exceeded the detection position of the multi feed detector 40 by the distance D3 determined in advance is determined in Step S18. Even in a case where there is multi feed, traces of the leading ends of the doubly fed documents which are strongly pushed remain, and even in a case where there is no multi feed, the leading end of the document flutters. Therefore, multi feed detection is not performed over the distance D3.

Although the distance D is measured by the encoder provided in the transport roller 24 in the exemplary embodiment, a timer may be provided to measure time instead of the distance D, or a position detector may be provided at a position corresponding to a distance D1+D3 to perform detection.

In a case where it is determined that D≥D1+D3 is satisfied in Step S18, processing proceeds to Step S20, and the multi feed detector 40 is turned on as shown in FIG. 5. Turning the multi feed detector 40 on means that the multi feed detector 40 executes multi feed detection.

Figure 6:
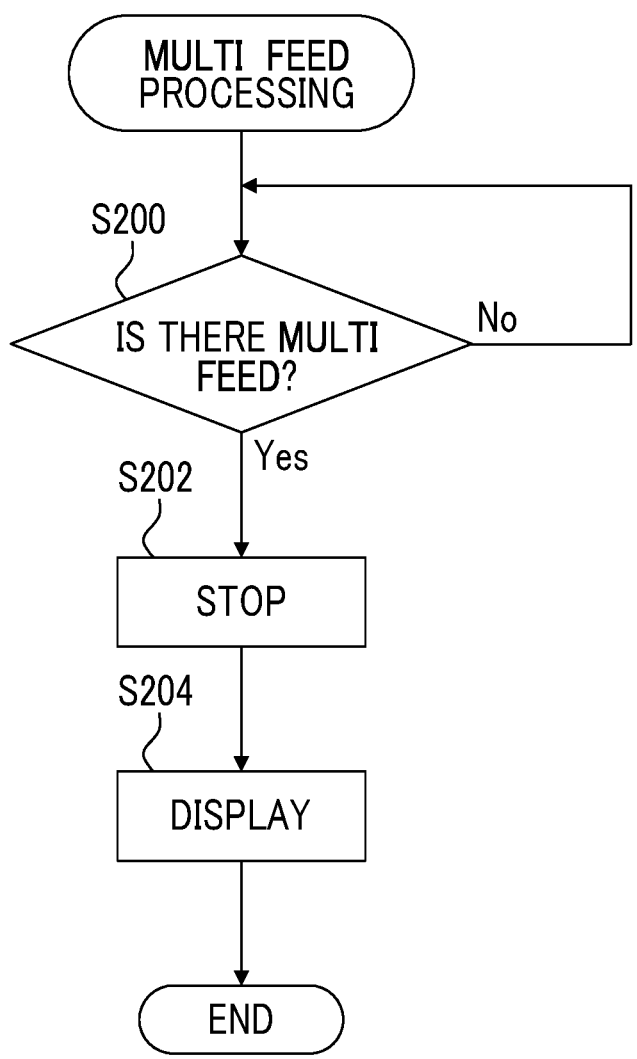
FIG. 6 is a flow chart showing operation flow of executing multi feed processing in the paper transport device according to the exemplary embodiment of the present invention.

That is, as shown in FIG. 6, whether or not there is multi feed is monitored in Step S200. Ina case where it is determined that there is multi feed in Step S200, processing proceeds to Step S202, the document transport device 12 stops transporting a document, the fact that document transport is stopped due to the occurrence of multi feed is displayed onto the aforementioned display device 64 in the next Step S204, and the processing is terminated.

In the next Step S22, the document transport device stands by until the position detector 38 detects a leading end of the next document. As shown in FIGS. 2 and 5, in a case where the leading end of the next document is detected in Step S22, processing proceeds to the next Step S24, and the multi feed detector 40 is turned off (multi feed detection by the multi feed detector 40 is stopped). As shown in FIGS. 2 and 5, although a trailing end of the previous document is on the upstream side in the document transport direction at this stage, the multi feed detector 40 is turned off in Step S24, and an adjustment processing period for the multi feed detector 40, which is executed in the next Step S26, is secured. In addition, herein, the stop of multi feed detection by the multi feed detector means that multi feed detection by the multi feed detector is not carried out. The adjustment of the multi feed detector may mean that electrical connection to the multi feed detector is blocked so that a detection signal is not output from the multi feed detector, may mean that output from the multi feed detector is not received, or may mean that a multi feed detection program is not executed. However, in adjustment processing of the multi feed detector, electrical connection to the multi feed detector may be temporarily made, or output from the multi feed detector may be temporarily received.

In the next Step S26, the following points of 1 to 3 are executed as the adjustment processing of the multi feed detector 40. The adjustment processing period for the multi feed detector 40 is a period corresponding to the distance D1 as shown in FIGS. 2 and 5.

1. Initialization of Substrate Circuit of Multi Feed Detector 40

Ina case where the multi feed detector 40 is, for example, an ultrasonic sensor, the ultrasonic sensor carries out multi feed detection such that a maximum value of output received by the receiving unit 44 is sampled and held, and determines whether or not there is multi feed by comparing the sampled and held value with a reference value. Therefore, initialization such as eliminating the sampled and held value is performed for the next multi feed detection.

2. Checking of Output Value

In a case where there is the multi feed detector 40 in the distance D2 where there is no document, whether or not a value from the receiving unit 44 receiving ultrasonic waves transmitted from the transmitting unit 42 exceeds a value determined in advance is checked. In a case where the value received by the receiving unit 44 does not exceed the value determined in advance, this case is processed as malfunction.

3. Setting of Reference Value

The value output only by the receiving unit 44 is set as a reference value.

The adjustment processing can be executed in a period until a trailing end of the previous document exceeds the detection position of the multi feed detector 40, except for "2. Checking of Output Value".

In the next Step S28, whether or not a document which is being transported is the last is determined. That is, a document before there is no document to be detected by the document detector 36 is the last document. In a case where it is determined that a document is not the last document in Step S28, processing returns to Step S16, and multi feed processing with respect to the next document is executed. On the other hand, in a case where it is determined that a document is the last document in Step S28, processing proceeds to Step S30, multi feed detection is executed until a trailing end of the last document is detected, and the processing is terminated since there is no next document.

That is, a distance between the previous document and the last document is stored, and multi feed detection is stopped at a stage where the last document has moved by a distance (D1-D2) after a document trailing end is detected by the position detector 38 (when the trailing end of the last document reaches the detection position of the multi feed detector 40). However, as in the case of the previous document, multi feed detection may be stopped at a stage where the last document has moved by the distance D2 after a trailing end of the last document is detected by the position detector 38.

Although an example in which a multi feed detection device is provided in an automatic document feeding apparatus is described in the exemplary embodiment, the present invention is not limited thereto, and the multi feed detection device may be provided in an image forming apparatus that transports paper for forming an image.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A multi feed detection device comprising:
a position detector that detects a position of paper being transported;
a multi feed detector that is disposed on a downstream side of the position detector in a paper transport direction and detects multi feed of the paper being transported; and
a control section for controlling the multi feed detection by the multi feed detector to stop the multi feed detection after a leading end of paper being transported next to paper, on which multi feed detection is executed by the multi feed detector, is detected by the position detector, regardless of a detection of a trailing end of paper, on which multi feed detection is executed by the multi feed detector.

2. A multi feed detection device comprising:
a position detector that detects a position of paper being transported;
a multi feed detector that is disposed on a downstream side of the position detector in a paper transport direction and detects multi feed of the paper being transported; and
a control section for controlling the multi feed detection by the multi feed detector to stop the multi feed detection after a leading end of paper being transported next to paper, on which multi feed detection is executed by the multi feed detector, is detected by the position detector,
wherein the control section performs control such that adjustment processing of the multi feed detector is executed while the multi feed detection by the multi feed detector is stopped,
wherein the adjustment processing comprises an initialization of the multi feed detector.

3. A paper transport device comprising:
a paper transporting member that transports paper;
a position detector that detects a position of the paper being transported by the paper transporting member;
a multi feed detector that is disposed on a downstream side of the position detector in a paper transport direction and detects multi feed of the paper being transported by the paper transporting member; and
a control section for controlling the multi feed detection by the multi feed detector to stop the multi feed detection after a leading end of paper being transported next to paper, on which multi feed detection is executed by the multi feed detector, is detected by the position detector, regardless of a detection of a trailing end of paper, on which multi feed detection is executed by the multi feed detector.

* * * * *